C. C. NORRIS.
LENS GUARD ATTACHMENT.
APPLICATION FILED MAR. 18, 1916.
1,217,876.
Patented Feb. 27, 1917.
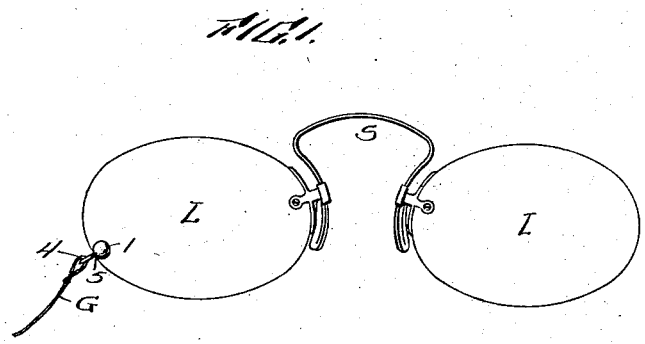
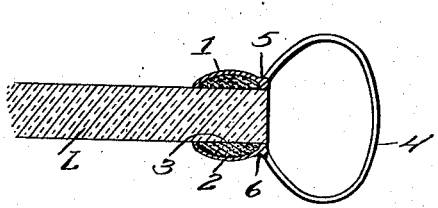
C. C. Norris, Inventor
Attorneys

UNITED STATES PATENT OFFICE.

CHESTER C. NORRIS, OF BAINBRIDGE, GEORGIA.

LENS-GUARD ATTACHMENT.

1,217,876.   Specification of Letters Patent.   Patented Feb. 27, 1917.

Application filed March 18, 1916. Serial No. 85,194.

*To all whom it may concern:*

Be it known that I, CHESTER C. NORRIS, a citizen of the United States, residing at Bainbridge, in the county of Decatur and State of Georgia, have invented certain new and useful Improvements in Lens-Guard Attachments; and I do hereby declare the following to be a full, clear, and exact description of the invention, such as will enable others skilled in the art to which it appertains to make and use the same.

This invention relates to optics, and more especially to lens connections; and the object of the same is to produce an improved connection for attachment to the lens without piercing the latter or altering it in any respect, to which attachment the cord or ribbon guard is to be fastened.

This object is carried out by constructing the same in the manner hereinafter more fully described and claimed, and shown in the drawings wherein:—

Figure 1 is a plan view of a pair of eyeglasses with this guard attachment applied to one of the lenses.

Fig. 2 is an enlarged sectional view through the outer end of one lens, giving a side elevation of the attachment itself.

In the drawings the lenses L are connected by a spring S, and it is customary to attach to one lens a guard G which may be of cord, ribbon, or sometimes of light chain. Hitherto it has been necessary with skeleton lenses to bore or drill a hole in the lens, or at least to alter the configuration of the same so that a metallic attachment or connection could be applied thereto with sufficient firmness to withstand the strain thrown upon the connection. Where the lens was surrounded by a metal frame, a ring was formed as part of or attached to the frame, and the guard passed through the ring, but the present invention is more particularly applicable to what are known as skeleton lenses which have no such frame.

Coming now to the details of the present invention as best illustrated in Fig. 2, the numerals 1 and 2 designate cup-shaped plates which may be plano-concave or concavo-convex, and which may have any agreeable and desirable contour though I would prefer to have them substantially round as best seen in Fig. 1. These two plates have their concave or cupped sides disposed against opposite faces of the lens L near its edge, and within the cups are drops of cement as indicated at 3, any suitable cement being employed which will reliably connect the metal with the glass. The cups confine the cement, prevent any of it adhering to the glass around the attachment so that it might be visible, and their edges cover the edges of the cement drops themselves, and it is not necessary that the bottoms of the cups or the interior of the concavities in these elements shall be smooth—in fact, if made rather rough the cement will adhere quite well thereto. These plates are connected, preferably integrally, by a ring broadly designated by the numeral 4, which ring may be initially a complete one, split, and its ends attached to the plate at the points 5 and 6; but in making the connection I would prefer to stamp out the plates and the ring all from one piece of metal so that the points of connection will be integral. Also I consider it highly desirable that the ring be of such size consistent with the thickness of the lens L upon which the attachment is ordinarily to be applied, that the upper and lower portions of such ring shall start away from the points of union with the plates on lines substantially forty-five degrees from a plane through the lens, as indicated by the dotted line in Fig. 2. In other words, the diameter of the ring is greater than the thickness of the ordinary lens so that when the attachment is in place the wire of which the ring is made starts upward from the upper plate and downward from the lower plate on lines at about forty-five degrees to the plane of the lens. This is for the purpose of preventing the guard from catching on the ring as it is often drawn across the face of the lens and over either plate. Obviously such undesirable contingency would occur if the ring were large enough so that it started away from the plate at almost right angles thereto.

In addition to the advantage above described, making the ring of greater diameter than the thickness of the ordinary lens permits the attachment to be applied to a thicker or a thinner lens. That is to say, if we assume that the lens L is thinner than as shown in Fig. 2, then the ring will be compressed so that the plates will stand closer to each other, drops of cement put in their cups, and the attachment passed onto the lens L and the plates pressed upon its opposite faces until the cement has set. Thereafter the upper and lower sides of the ring may start away from the plates at a little steeper angle than herein shown, but no harm will be done. On the other hand, if the lens be thicker than shown in Fig. 2, the ring 4 could be opened yet a little wider and still the plates could be slipped over the lens and cemented to its opposite faces in the manner described. While I have called the element 4 a ring, it is not necessary that it be round as it is obvious that it could be oval, or angular and especially triangular, although if angular I would prefer that all corners be rounded off so that the guard could not catch thereon. I have made this attachment of gold, and used the ordinary cement for connecting it to the lens, and found that it works very successfully and the union is reliable and lasting. The ring stands in a plane substantially at right angles to the plane of the lens, and as it is of greater diameter than the aggregate thickness of the lens and both plates it obviously prevents the lens or plates from striking a table or desk when the glass is laid upon the same.

What I claim is:

1. A guard attachment for an eye-glass lens consisting of a ring standing in a plane at right angles to that of the lens and of a diameter greater than the thickness of such lens so that it extends beyond both faces of the same, and means for securing the ends of the ring to said lens.

2. A guard attachment for an eye-glass lens comprising metallic fastening devices secured to said lens at its edge, and a split ring standing in a plane at right angles to that of the lens and of such size that it extends beyond both of said devices, its extremities being united with the latter.

In testimony whereof I affix my signature.

CHESTER C. NORRIS.

Copies of this patent may be obtained for five cents each, by addressing the "Commissioner of Patents, Washington, D. C."